United States Patent

Brooks

[15] 3,640,196
[45] Feb. 8, 1972

[54] PHOTOGRAPHIC APPARATUS FOR MECHANICALLY ACTUABLE PHOTOFLASH UNITS

[72] Inventor: David N. Brooks, West Peabody, Mass.
[73] Assignee: Eastman Kodak Company, Rochester, N.Y.
[22] Filed: Feb. 12, 1970
[21] Appl. No.: 10,068

Related U.S. Application Data

[63] Continuation of Ser. No. 655,468, July 24, 1967, abandoned.

[52] U.S. Cl. ............................................. 95/11.5 R, 240/3
[51] Int. Cl. ...................... F21k 5/02, F21k 5/00, G03b 9/70
[58] Field of Search .................. 95/11.5; 240/3; 431/92, 93, 431/95

[56] References Cited

UNITED STATES PATENTS

| 590,204 | 9/1897 | Blackmore | 95/1.5 |
| 1,436,715 | 11/1922 | Jackson | 431/92 |

Primary Examiner—Samuel S. Matthews
Assistant Examiner—Robert P. Greiner
Attorney—J. Addison Mathews and Robert W. Hampton

[57] ABSTRACT

An assembly in photographic apparatus for mechanically firing percussively ignitable photoflash lamps preferably contained in a multilamp unit or flashcube. The assembly includes a mechanism responsive, for example, to film winding for sequentially indexing the flashlamps and setting the firing mechanism to prepare the apparatus for firing respective ones of the flashlamps at a firing locus or position. The firing mechanism includes a rapidly movable drive or hammer that is first cocked or set and then released to synchronously effect both ignition of the flashlamp and opening of the shutter.

1 Claims, 5 Drawing Figures

PATENTED FEB 8 1972

DAVID N. BROOKS
INVENTOR

BY Joseph C Ryan
ATTORNEY

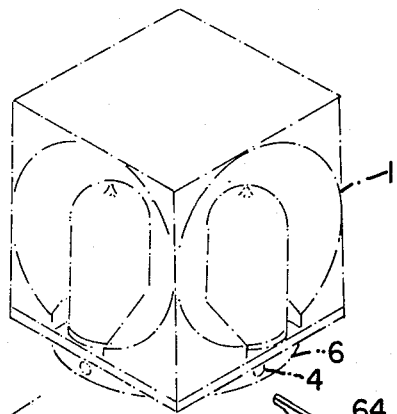
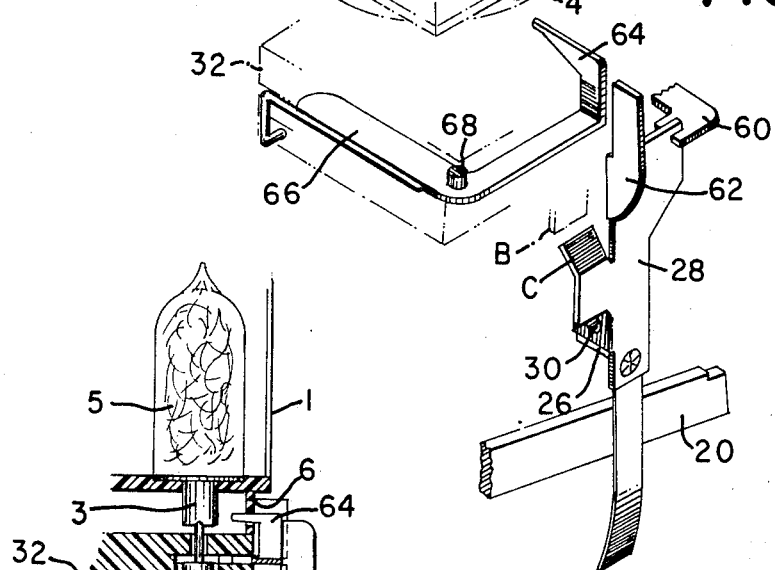
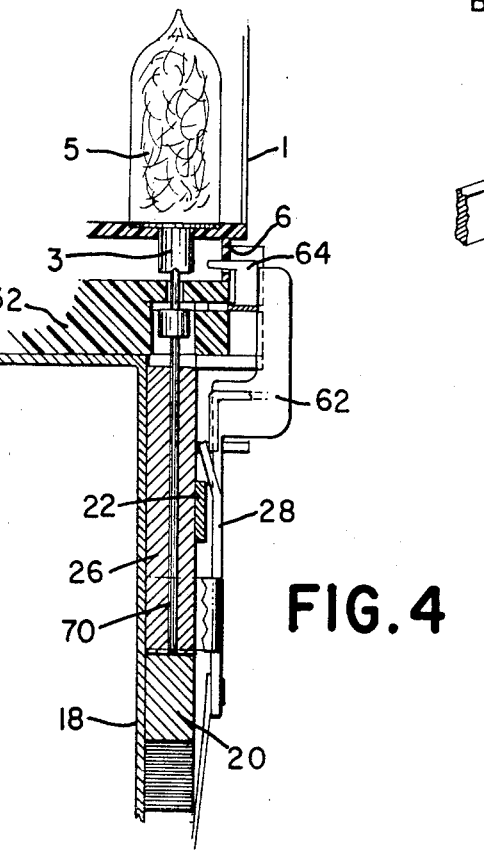
FIG. 3
FIG. 4
DAVID N. BROOKS
INVENTOR

PHOTOGRAPHIC APPARATUS FOR MECHANICALLY ACTUABLE PHOTOFLASH UNITS

CROSS-REFERENCE TO RELATED APPLICATION

This application is a continuation of U.S. Pat. application Ser. No. 655,468 filed July 24, 1967, in the name of David N. Brooks, entitled Photographic Apparatus.

This invention relates to photographic apparatus and more particularly to camera mechanisms designed to fire a flashlamp synchronously with the exposure of the film with which the camera is provided.

For many years most cameras sold commercially have been provided with a source of electrical energy, such as dry cell batteries, which provide the means for energizing and firing flashlamps of the electric primer type. In some cases the batteries are located in a compartment provided therefor within the main body of the camera whereas in other cases the batteries are located in an attachment, usually called a flashgun. In the former arrangement the main body of the camera is also provided with a reflector and a suitable socket or receptacle to receive a flashlamp whereas in the latter the reflector and the lamp socket or receptacle are all part of the flashgun.

With the miniaturization of cameras and flashlamps, both of the foregoing arrangements for providing an auxiliary light source for photography left more and more to be desired. In the case of flashguns, this "attachment" was entirely too large relatively speaking with respect to the miniaturized camera with which it was associated. In the case of cameras having a lamp socket or receptacle and a reflector built in, the miniaturized lamps became more and more difficult and awkward to handle, malfunctions increased and the built-in reflector took up too much space in the miniaturized camera.

The introduction of the multilamp photographic flashlamp unit, generally known as a flashcube, represented a significant advance in art. It eliminated the need for flashguns and it eliminated the need for built-in reflectors. It also eliminated handling of the flashlamp individually. However, it did not eliminate the need for batteries.

One of the most chronic problems and perhaps most exasperating circumstance with which the average amateur photographer is confronted is weak batteries—batteries too weak to fire the lamp. The average amateur photographer will usually have a spare flash lamp or two but rarely if ever will he have a pair of spare fresh batteries. Thus a single shot, or more probably a whole sequence of shots will be lost. Dry cell batteries, by their very nature, tend to lose their strength gradually over an extended period of time. Many amateur photographers take flash pictures less than half a dozen times a year, thus providing more than enough time between uses for the batteries to deteriorate from strong to weak—from operativeness to inoperativeness.

In the copending application of O. H. Biggs et al., Ser. No. 600,149 filed Dec. 8, 1966, entitled "Photoflash Lamp," there is disclosed a percussive-type flashlamp which requires no batteries for its operation and a mechanism integrated into a camera for firing it. In the copending application of D. N. Brooks, Ser. No. 648,592, filed June 26, 1967, entitled "Photographic Flashlamp Unit," there is disclosed a multilamp photographic flashlamp unit of the flashcube type having flashlamps of the percussive type.

The principal object of this invention is to provide a camera with a mechanism for firing flashlamps of the percussive type.

Another object is to synchronize the lamp firing mechanism with the shutter actuating mechanism.

A further object is to provide a camera with a mechanism for firing flashlamps of the percussive type arranged in a multilamp photographic flashlamp unit of the flashcube type.

These and other objects, advantages and features are attained, in accordance with the principles of this invention, by providing a camera with a mechanism for firing a percussive-type flashlamp, said mechanism including means for controlling the shutter opening mechanism whereby the desired synchronization is assured. More particularly, in the specific embodiment illustrated and described herein, the camera is provided with a firing pin, a hammer to actuate it and means, controlled by the actuation of the hammer to trip the shutter. Since the lamps are of the percussive type, means are provided for securing them in position on the camera during firing.

In the accompanying drawing illustrating a specific embodiment of this invention, FIG. 1 is a front perspective view of the apparatus of this invention with a camera body and some of its components shown in phantom in order to illustrate more clearly the camera mechanisms with which the apparatus of this invention is primarily associated.

FIG. 3 is a fragmentary exploded detail in perspective of the mechanism for locking a flashcube in position during firing.

FIG. 4 is a fragmentary, sectional detail showing one of the lamps of a flashcube and the firing pin and locking mechanisms associated therewith at the instant of firing.

Figure 1:
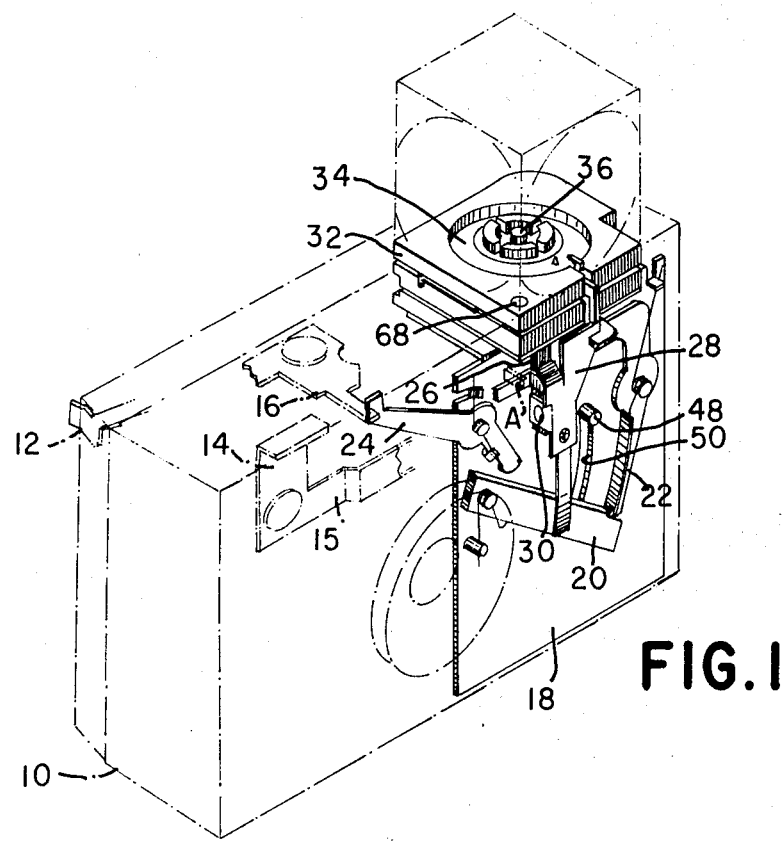
Figure 2:
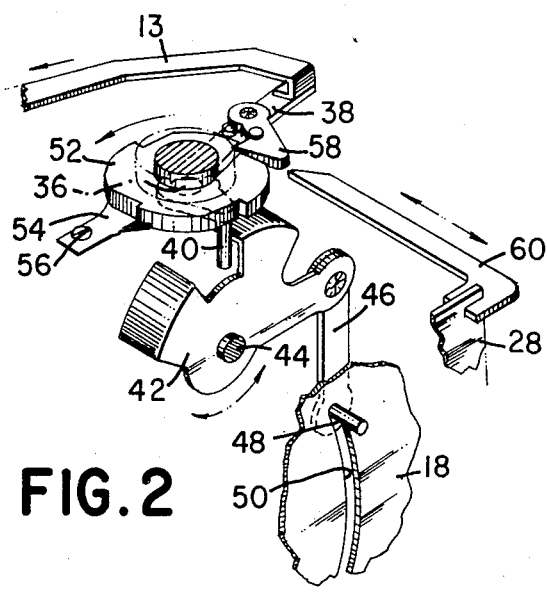
FIG. 2 is a fragmentary detail in perspective of the hammer cocking and flashcube rotating mechanism.

Referring now to the drawings, a camera provided with a specific embodiment of the apparatus of this invention is shown in the cocked position in FIG. 1 and the mechanism for setting it is shown in FIG. 2. As is shown in FIG. 1, camera components with which the apparatus of this invention is associated are shown in phantom and the flashcube 1 is similarly illustrated. The camera components illustrated in FIG. 1 include a camera body 10, a film advancing lever 12, a shutter actuator 14 and a spring-loaded shutter blade operator 16. The spring-loaded shutter blade operator 16 is shown in the cocked position. The film advancing lever 12 is shown in the rest position. A link 13 extends across the top of the camera body immediately beneath the top face thereof and connects the film advancing lever to the cocking mechanism shown in FIG. 2 so that the mechanism of FIG. 2 responds to operation of the film advancing lever.

As shown in FIG. 1, the major components of the apparatus of this invention are organized about a mounting plate 18 affixed to the front face of the camera body 10 and inside the cover thereof. These components include a spring-loaded hammer 20, a spring-loaded hammer latch 22 and a spring-loaded shutter rocker arm 24, all pivotally mounted on the mounting plate 18. A firing pin housing 26 is secured to the mounting plate 18 and a detent actuating lever 28 is pivotally supported thereon at 30. As will be described more fully below, this detent actuating lever 28 is disposed in cooperative relationship with respect to a flashcube mounting block 32 located on the top face of camera body 10. This mounting block 32 includes a flashcube socket 34 having a central mounting pin 36. As noted above, the link 13 extends across the top of the camera body, being connected at one end to the film advancing leer 12 and as shown in FIG. 2, it is pivotally connected at the other end thereof to one end of a bell crank cocking lever 38 fulcrumed on the central mounting pin 36 of the flashcube socket 34. The other arm of this bell crank cocking lever 38 has a cocking actuator pin 40 depending therefrom. In its normal rest position, this pin bears against a projecting face of a cocking actuator 42 which is pivotally mounted at 44 on the inside face of the mounting plate 18. A link 46, depending from the cocking actuator 42, is provided with a cocking stud 48 projecting laterally therefrom and extending through an elongated slot 50 provided therefor in the mounting plate 18.

As noted immediately above, the bell crank cocking lever 38 is fulcrumed on the central mounting pin 36 of the flashcube socket 34. A ratchet 52 is mounted on the pin 36 immediately above the bell crank cocking lever 38. The ratchet 52 is undercut on the bottom face thereof and adjacent to the teeth thereof. Plate spring 54, fixedly mounted at 56 has an upturned frontal edge which interlocks with the undercuts of the ratchet to prevent backup by the rachet. A pawl 58 is pivotally mounted on the bell crank cocking lever 38. Thus actuation of the bell crank cocking lever 38 by the film advancing lever 12 through link 13 also rotates the rachet 52 and thus, through the central mounting pin 36, effects rotation of the flashcube 1. A portion of a mechanism for locking out the pawl and thus preventing further rotation of the flashcube during further advancement or actuation of the film advancing lever 12 is also shown in FIG. 2. It comprises a blocking finger 60 mounted on the upper end of the detent actuating lever 28. As will be described more fully below in the description of the operation, this blocking finger 60 is, under certain circumstances, moved into a position with respect to the pawl 58 and the ratchet 52 so that actuation of the latter by the former is prevented.

In the foregoing description of FIG. 1, it was indicated that one of the components of the apparatus of this invention is a detent actuating lever 28 pivotally mounted at 30 on firing pin housing 26 which is secured to the mounting plate 18. As shown in FIGS. 1 and 3, the upper end of this detent actuating lever 28 is provided with a finger 62. This finger 62 is aligned with a detent 64 formed on one end of a spring-loaded lever 66 pivotally mounted intermediate its ends at 68 in a chamber provided therefor by a cut in the flashcube mounting block 32. The detent 64 in turn is aligned with one of the holes 4 formed in a locking ring 6 of the flashcube 1. Thus, as will be described more fully below in the description of the operation, under certain circumstances the upper end of the detent actuating lever 28 will be advanced so that the finger 62 thereof will displace the detent 64 and effect its insertion into the hole 4 in the locking ring 6 to thereby securely retain the flashcube 1 in its socket 34 of the flashcube mounting block 32. A fragmentary portion of the spring-loaded hammer 20 is shown in this figure in the "up" or uncocked position.

Figure 5:
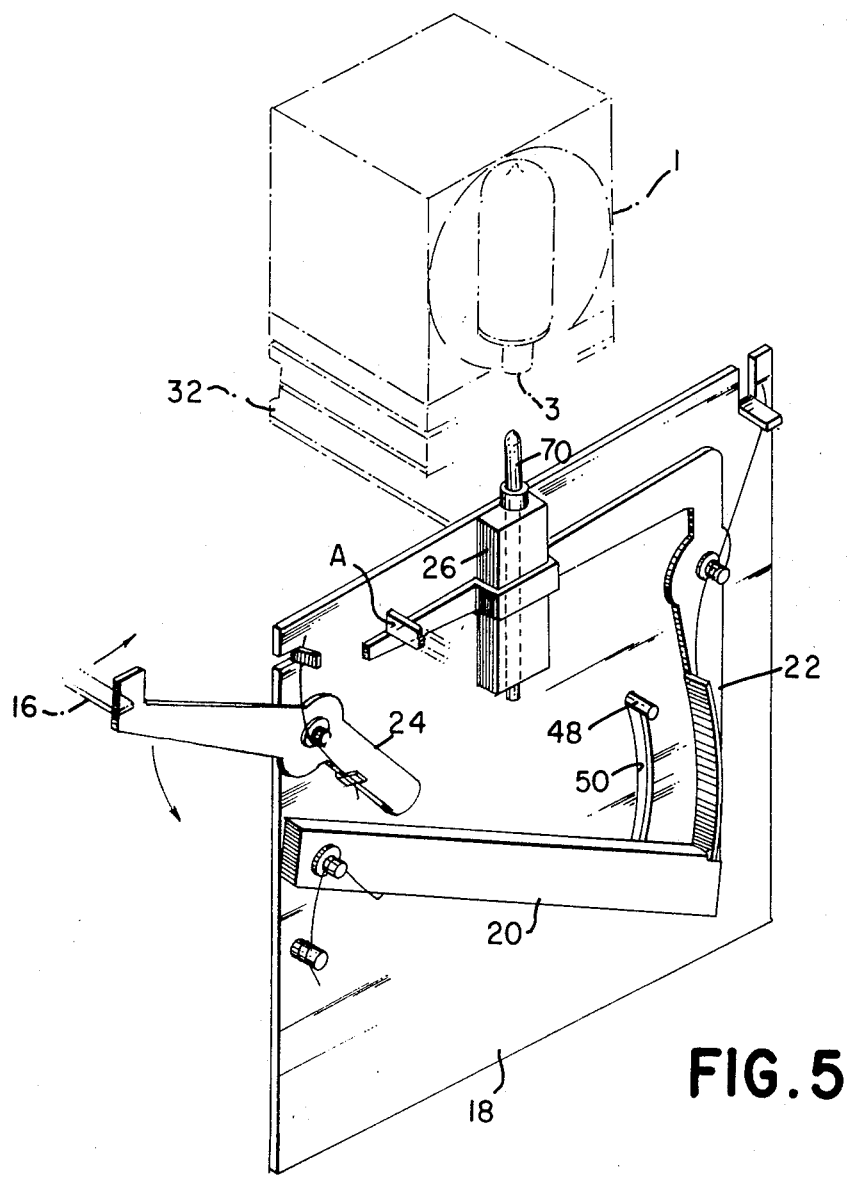
FIG. 5 is a front perspective view of the lamp firing mechanism and the shutter actuating mechanism associated therewith.

FIG. 5, like FIG. 1, shows the hammer 20 in its cocked position, held therein by the hammer latch 22. The spring-loaded shutter blade operator 16 is also cocked by the shutter rocker arm 24 which is spring-loaded in a clockwise direction as viewed in FIG. 5. As noted above in the description of FIG. 1, the firing pin housing 26 is attached to mounting plate 18. As shown in FIGS. 4 and 5, firing pin 70 is located within firing pin housing 26. When struck by the spring-loaded hammer 20 upon its release, the firing pin 70 will be driven forward to strike a sharp blow against and deform the primer cup 3 of the percussive-type flashlamp 5 as shown in FIG. 4. FIG. 4 also illustrates the locking of the flashcube 1 in its socket on the mounting block 32 by means of the detent 64 extending into the hole 4 in the locking ring 6 of the flashcube 1.

An operation cycle of the apparatus of this invention will now be described. As shown in FIGS. 1 and 5 the apparatus is all set for the taking of a picture, i.e., the shutter blade operator 16 and the hammer 20 are both in the cocked position. They are caused to assume the cocked position by actuation of the FIG. 2 mechanism in response to the operation of the film advancing lever 12 by the photographer. Immediately after a picture has been taken and before the photographer advances the film to the next exposure, the hammer 20 is in the up position with the top face thereof adjacent to the cocking stud 48 and the free end thereof abutting the inside face of the lower portion of the hammer latch 22. At the same time the shutter rocker arm 24 has been displaced counterclockwise from the position thereof as shown in FIGS. 1 and 5 because an end thereof lies in the path of the hammer during its firing stroke.

Cocking of the hammer 20 and the shutter blade operator 16 is accomplished by the mechanism of FIG. 2 during the counterclockwise movement of the film advancing lever 12 when the photographer advances the film to the next exposure. Counterclockwise rotation of the film advancing lever 12 through link 13 causes the bell crank cocking lever 38 to which it is connected to rotate counterclockwise and cause the cocking actuator pin 40 depending therefrom to rotate the cocking actuator 42 clockwise. Clockwise rotation of the cocking actuator 42 is translated through link 46 depending therefrom into a downward movement of the cocking stud 48 in the elongated slot 50 through which it extends. Downward movement of the cocking stud 48 displaces the spring-loaded hammer 20 in a clockwise direction with the free end thereof riding along the inside face of the lower portion of the spring-loaded hammer latch 22 until the tip of this lower portion of the hammer latch snaps into a notch at the end of the hammer 20 to thereby secure the hammer in a cocked position.

Cocking of the shutter blade operator 16 is effected by the shutter rocker arm 24 during the displacement of the hammer 20 to the cocked position as just described. The spring-loaded shutter rocker arm 24 is rotated clockwise by its spring and is displaced so that it holds the spring-loaded shutter blade operator 16 in a cocked position.

The FIG. 2 mechanism just described for effected cocking of the hammer and, in turn, cocking of the shutter blade operator, also includes means for effecting rotation of the flashcube 90° in order to move a fresh flashlamp into picture taking position. This is accomplished by a pawl and ratchet arrangement which is actuated by advancement by the film advancing lever 12. Pawl 58, which is pivotally mounted on the bell crank cocking lever 38, is displaced counterclockwise during the counterclockwise rotation of the lever 38. Since this pawl 58 is normally in interlocking engagement with one of the teeth of the ratchet 52, this displacement of the pawl causes the ratchet 52 to rotate counterclockwise and thus cause the central mounting pin 36 to rotate. This rotation of the pin 36 causes the flashcube 1 mounted thereon to rotate 90° and thus presents a fresh flashlamp to the picture taking position.

As soon as the pawl 58 vacates the position which it occupies as shown in FIG. 2, because of the counterclockwise rotation thereof just described, the blocking finger 60 moves into this position. As shown in FIG. 1 and as noted above, the blocking finger 60 is a lateral projection from the upper end of the detent actuating lever 28 which is pivotally mounted intermediate its ends at 30 on the firing pin housing 26. As is shown in FIGS. 1 and 3, the lower end of this detent actuating lever 28 is a plate spring member curved inwardly. Thus, as the hammer 20 is displaced from the FIG. 3 position to the FIG. 1 position during cocking, it displaces this lower inwardly curved portion of the lever 28 and causes the lever to rotate about its pivot 30, the lower end moving outwardly and the upper end moving inwardly. In doing so, the blocking finger 60 projecting from the upper end thereof is advanced and moves into the position just vacated by the pawl 58 as it rotates the ratchet 52 (FIG. 2) to rotate the flashcube 90°.

As shown in FIG. 3 and as noted above in the description thereof, the detent actuating lever 28 also has a finger 62 projecting therefrom. Thus, during the inward movement of the upper end of the detent actuating lever 28 as described immediately above, the finger 62 thereof moves into engagement with detent 64 on one end of lever 66, causing the lever 66 to rotate about its pivot 68 and advance the detent 64 into one of the holes 4 in the locking ring 6 of the flashcube 1 just as the flashcube 1 has completed its 90° rotation as just described.

It should be noted at this point that cocking of the hammer 20, cocking of the shutter blade operator 16 and rotation of the flashcube 1 all take place at about the same time since they all respond to displacement of the film advancing lever 12 in a counterclockwise direction as viewed in FIGS. 1 and 2. However, since the film advancing lever 12 must be returned to its rest position and, in some cameras, it must be advanced for at least a portion of another forward stroke, means must be provided for preventing un-cocking of the cocked mechanism and for preventing further rotation of the flashcube.

During the return clockwise rotation of the film advancing lever 12, the bell crank cocking lever 38 is caused to rotate clockwise, the pin 40 depending from lever 38 causes the cocking actuator 42 to rotate counterclockwise and thus draws the cocking stud 48 upwardly and back to its rest position as shown in FIGS. 1, 2 and 5. Although the cocking stud 48 returns to its rest position, the hammer latch 22 holds the hammer 20 cocked and the rocker arm 24 holds the shutter blade operator 16 cocked. Thus the return stroke of the film advancing lever does not disturb these cocked members.

Although the return stroke of the film advancing lever 12 causes the bell crank cocking lever 38 to rotate clockwise and it carries the pawl 58 with it, the pawl 58 is cammed out of engagement with the ratchet 52 by the tip of the blocking finger 60 which moved into the normal rest position of the pawl 58 near the end of the forward stroke of the film advancing lever. Clockwise rotation of the ratchet 52 during the return stroke of the film advancing lever 12 is prevented by the upturned frontal edge of the plate spring 54 interlocking in the undercut portion of the bottom face of the ratchet 52.

In view of the foregoing, it is now apparent that during the next forward stroke of the film advancing lever 12, if such is needed to complete advancement of the film to the next exposure, none of the mechanisms associated with the flashcube will be disturbed. The cocking stud 48 will move within its slot 50 but will not disturb the hammer 20 which is held cocked by the hammer latch 22; the pawl 58 will move with the bell crank cocking lever 38 but it will not carry the ratchet 52 with it because the blocking finger 60 lies therebetween; and the detent 64 will still be securing the flashcube 1 because there will be no displacement of the detent actuating lever 28.

When the film has been advanced sufficiently to present the next exposure to the picture taking position, the camera and the associated flashcube mechanisms are ready for the picture to be snapped. This takes place when the photographer depresses the shutter actuator 14. The shutter actuator 14 comprises the exposed portion of a spring-loaded hammer release trigger 15 which is pivotally mounted in the upper left hand corner of the camera body 10 as shown in FIG. 1. In convention cameras this hammer release trigger 15 is normally called a shutter release trigger because it trips the shutter blade operator 16 to momentarily uncap the film exposure aperture. However, in this instance, it is a hammer release trigger because, when actuated by depression of the shutter actuator 14, it trips the hammer 20. This hammer release trigger 15 has a pair of laterally extending tabs A and B. As shown in FIG. 5, tab A overlies the hammer latch 22 near the free end thereof. As shown in FIG. 3, tab B is disposed in cooperative relationship with respect to tab C of the detent actuating lever 28. Thus, when the photographer depresses shutter actuator 14 and causes the spring-loaded hammer release trigger 15 to rotate clockwise, tab A thereof pushes downwardly on the adjacent arm of the hammer latch 22 thus causing the latch 22 to rotate counterclockwise as viewed in FIG. 5 and thus release the hammer 20. At about the same time the tab B of the hammer release trigger 15 has moved into interlocking relationship with respect to tab C of the detent actuating lever 28 to lock the detent 64 in the locking ring 6 of the flashcube 1 during firing.

As the hammer 20 moves upwardly toward the firing pin 70, it strikes the shutter rocker arm 24 (FIG. 5) and causes it to rotate counterclockwise and eventually release the cocked shutter blade operator 16 to momentarily uncap the film exposure aperture. This timing sequence of having the hammer trip the shutter rather than vice versa is necessary in order to obtain the desired synchronization of the flashing of the lamp with the exposure of the film.

Actual firing of the flashlamp is illustrated in FIG. 4. As shown in this figure, the hammer 20 has driven the firing pin 70 up against the primer cup 3 of the percussive-type flashlamp 5 and caused sufficient deformation of the cup to ignite the primer and fire the lamp. This figure also illustrates the interlocking of tabs B and C to provide the necessary locking of the flashcube on its mounting block 32 during firing of the lamp.

When the operator releases the shutter actuator 14 after the picture has been taken, the spring-loaded hammer release trigger 15 returns to its normal rest position with the tabs A and B thereof also returning to their normal position. This return of the tab A permits the spring-loaded hammer latch 22 to rotate clockwise as viewed in FIG. 5 so that the lower portion thereof will be able to interlock with the hammer 20 during the next cocking stroke of the cocking stud 48. This return of the tab B frees the detent actuating lever 28 and thus permits it to effect disengagement of the detent 64 with the locking ring 6 of the flashcube. Thus the flashcube is now free to be rotated again. This return of the detent actuating lever 28 also effects retraction of the blocking finger 60 and thus permits the pawl 58 (FIG. 2) to resume its engagement with the next tooth on the ratchet 52 to cause the flashcube 1 to rotate during the next forward stroke of the film advancing lever 12.

I claim:

1. A photographic camera for exposing film and for firing a disposable flash device movably receivable on the camera; the flash device having a hermetically sealed envelope containing combustible material, and mechanically actuatable structure, including percussively ignitable primer material, for initiating combustion of the combustible material; the camera comprising:
   a shutter mechanism operative to effect the exposure of film receivable in the camera, said mechanism having a set position and being releasable therefrom to effect the exposure;
   a latching member for releasably maintaining the shutter mechanism in its set position;
   an actuating member movable between a retracted position spaced from the flash device, and a position for engaging the device and for actuating the combustion initiating structure to fire the flash device;
   a driver having an energized condition from which the driver is releasable to effect an impacting force; and,
   means for translating the impacting force of said driver to said actuating member and to said latching member, thereby to synchronously effect firing of the flash device and operation of the shutter.

2. In a photographic camera having a casing, a film advancing member accessible from outside the casing, and a shutter operative to expose film receivable in the camera; apparatus for receiving and firing a percussive-type flash device on the camera and synchronously with operation of said shutter, said apparatus comprising:
   a seat on said casing for removably receiving the flash device on the camera;
   a firing pin axially aligned with the flash device and movable into engagement with the device to fire the flashlamp;
   a hammer having a cocked condition and being releasable from such condition to drive said firing pin into engagement with the flash device;
   means coupling the film advancing member and said hammer for cocking said hammer; and,
   means for releasing said hammer from its cocked position to drive said firing pin into engagement with the flash device and to operate the shutter.

3. A photographic camera for exposing film receivable in the camera, and usable with a mechanically firable flashlamp device including combustible material and percussively ignitable primer material for initiating combustion of the combustible material, the camera comprising:
   a casing;
   a shutter mounted within the casing and operative to expose film in the camera;
   a camera setting member accessible from outside the casing and movable to effect setting of the camera prior to exposing film in the camera;
   means on the casing for removably receiving the flashlamp device on the camera;
   a hammer member having a latched position and being releasable for movement to a second position, the movement to the second position mechanically effecting both ignition of the primer material, to fire the flashlamp device, and synchronous operation of the shutter, to expose film; and, means coupling the setting member and the hammer member for moving the hammer member to its latched position in response to movement of the setting member.

4. A photographic camera as claimed in claim 3, wherein the flashlamp device is supported in a multilamp unit, wherein said flashlamp receiving means is rotatable in response to movement of said setting member to index respective ones of the flashlamps to a predetermined firing position, and wherein said coupling means comprises a member movable in response to rotation of said flashlamp receiving means for moving the hammer member to its latched position.

5. A photographic camera for use with a multilamp flash unit, the unit comprising a plurality of percussive-type flash devices each with its own reflector organized about a base member, the camera comprising:
   a casing;
   means for removably receiving film in the camera;
   film winding means actuatable from outside the casing to wind film in the camera;
   a shutter mechanism including a shutter, and a trigger actuatable from outside the casing to operate the shutter and to effect an exposure;
   a socket on said casing for receiving said flash unit;
   a firing pin movable into engagement with a flash device at a firing station;
   a hammer having a cocked condition from which said hammer is releasable for effecting movement of the firing pin into engagement with the flash device to fire the flash device at the firing station, and for operating the shutter to effect an exposure;
   means coupling said film-winding means and said hammer for cocking said hammer upon actuation of said film-winding means; and,
   means responsive to actuation of said trigger for releasing said hammer, whereby said hammer effects operation of said shutter and synchronously effects movement of said firing pin into engagement with a flash device at said firing station.

6. A photographic camera as claimed in claim 5 and further comprising means for positively securing the flash unit in said socket during firing of the flash devices.

7. A photographic camera as claimed in claim 5 and further comprising means for indexing the flash devices after a respective one of the devices has been fired and for positioning another of the devices at the firing station.

8. A photographic camera for exposing film receivable in the camera, and usable with percussively firable flashlamps in a multilamp unit; the camera comprising:
   film-winding means operative for winding film in the camera;
   means for removably receiving the multilamp unit on the camera and for indexing the flashlamps to position respective ones of the lamps at a predetermined firing location;
   an actuating member having a retracted position wherein the member is spaced from the multilamp unit, and an extended position for effecting firing of the flashlamp at the firing location;
   a driver member having a set position from which the member is releasable to effect movement of said actuating member from the retracted position to the extended position to fire the flashlamp; and,
   means coupling said driver and actuating members to said film-winding means for setting said driver member and for effecting movement of aid actuating member to its retracted position, both in response to operation of the film-winding means.

9. A photographic camera as claimed in claim 8 wherein said coupling means includes said means for positioning respective ones of the flashlamps at the firing location.

10. A photographic camera for exposing film receivable in the camera, and usable with percussively firable flashlamps in a multilamp unit; the camera comprising:

means for indexing the flashlamps to position respective ones of the flashlamps at a firing locus;
an actuating member having a retracted position wherein the member is spaced from the flashlamps and multilamp unit, and an extended position for firing of the flashlamp at the firing locus;
a driver member for moving said actuating member from the retracted position to the extended position to fire the flashlamp; and,
means responsive to indexing of the flashlamps for effecting movement of said actuating member to its retracted position and for preparing said actuating member to fire the next respective flashlamp positioned at the firing locus.

11. A photographic camera for exposing film receivable in the camera, and usable with percussively firable flashlamp devices in a multilamp unit removably receivable on the camera; the camera comprising:
   means for indexing the flashlamp devices in a multilamp unit received on the camera, to position respective ones of the flashlamp devices at a firing locus;
   a firing mechanism for mechanically firing the respective flashlamp device at the firing locus, said firing mechanism including a driver member having a set position and being movable to a released position for effecting a mechanical force, and means for translating the mechanical force to the flashlamp device to fire the flashlamp device;
   a film-winding mechanism operative for advancing film in the camera; and,
   means for coupling said drive member and said film-winding mechanism for setting said driver member in response to operation of the film-winding mechanism.

12. Photographic apparatus for use with a lamp unit of the type having at least one flash lamp actuable by application of a mechanical force to the unit, said apparatus comprising:
   means for applying a mechanical actuating force to said unit;
   means for receiving and holding such a unit, said means being releasable in response to the application of a manual releasing force to said unit for removing said unit from said apparatus;
   locking means adjustable from a first condition permitting said manual removal of said unit to a second condition preventing said removal of said unit; and
   means for adjusting said locking means from said first condition to said second condition in response to picture-taking actuation of said apparatus.

13. A camera for use with a flash unit having at least one flash lamp fireable by application of mechanical force to the unit, said camera comprising:
   a shutter mechanism including means for receiving shutter actuation initiating force;
   means for receiving such a flash unit and for positioning a flash lamp of such a unit at a firing site;
   acting means movable from a first position to a second position for applying a mechanical force to such a unit to fire a flash lamp so positioned;
   driving means movable from a first position to a second position, said driving means including:
      means for striking said actuating means during movement of said driving means from its first position to its second position to move said actuating means from its first position to its second position; and
      means for striking the means for receiving a shutter actuating initiating force to initiate actuation of said shutter mechanism in response to movement of said driving means from its first position to its second position;
   resilient means urging said driving means from said first position to said second position;
   latch means for holding said driving means in its first position; and
   means for releasing said latch to effect flash picture taking operation of said camera.

14. A camera for use with a flash unit having at least one flash lamp fireable by application of mechanical force to the unit, said camera comprising:
- a shutter mechanism including:
  - a shutter driver having an energized position, and
  - a shutter driver latch for holding said shutter driver in its energized position, said latch being releasable in response to the application thereto of a shutter actuation initiating force;
- means for receiving such a flash unit and for positioning a flash lamp of such a unit at a firing site;
- actuating means movable from a first position to a second position for applying a mechanical force to such a unit to fire a flash lamp so positioned;
- driving means movable from a first position to a second position, said driving means including:
  - means for striking said actuating means during movement of said driving means from its first position to its second position to move said actuating means from its first position to its second position to fire such a flash lamp, and
  - means for applying a shutter actuating initiating force to said shutter driver latch;
- resilient means urging said driving means from said first position to said second position;
- latch means for holding said driving means in its first position; and
- means for releasing said latch to effect flash picture taking operation of said camera.

* * * * *